(12) United States Patent
Nakanishi et al.

(10) Patent No.: US 6,756,337 B2
(45) Date of Patent: Jun. 29, 2004

(54) PURIFICATION CATALYST FOR EXHAUST GAS

(75) Inventors: Yoshiyuki Nakanishi, Wako (JP); Yuichi Matsuo, Wako (JP); Kazuhide Terada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/288,576

(22) Filed: Nov. 6, 2002

(65) Prior Publication Data

US 2003/0092562 A1 May 15, 2003

(30) Foreign Application Priority Data

Nov. 7, 2001 (JP) ........................................ 2001-341934

(51) Int. Cl.[7] ................................................ B01J 29/06
(52) U.S. Cl. ............................ 502/65; 502/64; 502/66; 502/73; 502/74
(58) Field of Search ............................... 502/64, 65, 66, 502/73, 74, 71, 77

(56) References Cited

U.S. PATENT DOCUMENTS

| | | | | |
|---|---|---|---|---|
| 4,394,300 A | * | 7/1983 | Chu et al. ...................... 502/77 |
| 4,439,409 A | * | 3/1984 | Puppe et al. ................. 423/706 |
| 4,485,185 A | * | 11/1984 | Onodera et al. .............. 502/71 |
| 4,749,671 A | | 6/1988 | Saito et al. |
| 5,733,837 A | * | 3/1998 | Nakatsuji et al. ........... 502/304 |

FOREIGN PATENT DOCUMENTS

| | | | |
|---|---|---|---|
| EP | 0 801 972 A1 | | 10/1997 |
| JP | 5-43517 | * | 2/1993 |
| JP | 08-071176 | | 3/1994 |
| JP | 08-131838 | | 5/1996 |

* cited by examiner

*Primary Examiner*—Kiley Stoner
*Assistant Examiner*—Christina Ildebrando
(74) *Attorney, Agent, or Firm*—Arent Fox PLLC

(57) ABSTRACT

A purification catalyst for exhaust gas has high purification performance for the exhaust gas even under a high oxygen concentration atmosphere. The purification catalyst for exhaust gas contains cerium oxide, zeolite carrying Pt, and tin or a tin oxide.

4 Claims, 1 Drawing Sheet

PURIFICATION CATALYST FOR EXHAUST GAS

BACKGROUND OF THE INVENTION

1. Technical Field

The present invention relates to a purification catalyst for exhaust gas under a high oxygen concentration atmosphere, and especially relates to a purification catalyst for diesel exhaust gas.

2. Related Art

The present applicant formerly proposed a purification catalyst for exhaust gas comprising zeolite carrying Pt and cerium oxide as a purification catalyst for exhaust gas for improving NOx (nitrogen oxides) purification performance (Japanese Patent Unexamined (KOKAI) Publication No.131838/1996). In this case, Pt is a metal for the catalyst, and demonstrates abilities for oxidizing and reducing the exhaust gas. The ability to oxidize in Pt contributes to oxidation reactions of HC (hydrocarbon)+$O_2 \rightarrow H_2O+CO_2$ and $CO+O_2 \rightarrow CO_2$. The ability to reduce in Pt contributes to a reduction reaction of $NO \rightarrow N_2$ by adsorbing NO in a theoretical air fuel ratio, and contributes to an oxidation reaction of $NO+O_2 \rightarrow NO_2$ and a reduction reaction of $NO_2+HC+O_2 \rightarrow N_2+CO_2+H_2O$ under the high oxygen concentration atmosphere.

Zeolite absorbs unburned HC in the exhaust gas so as to concentrate it, and supplies the unburned HC to Pt as a selective reducing type catalyst. Therefore, it is possible to improve the NOx purification rate under the high oxygen concentration atmosphere. NOx concentration in the vicinity of Pt is increased because the cerium oxide absorbs NOx under the high oxygen concentration atmosphere. Therefore, it is also possible to improve NOx purification performance under the high oxygen concentration atmosphere. The cerium oxide also has an effect of suppressing thermal deterioration of the catalyst.

In the case in which the concentration of the unburned HC as a reducing agent is extremely low at HC/NOx$\leq$3 as in diesel engine exhaust, the NOx purification performance of Pt as a catalyst metal is low. Therefore, the reducing ability of Pt must be improved. As a method to improve the reducing ability in Pt, a catalyst in which Pt and Sn are simultaneously carried by a high specific surface carrier (zeolite) is proposed in, for example, Japanese Patent Unexamined (KOKAI) Publication No.71176/1994. In this case, Sn has a spillover effect in which O atoms adsorbed on Pt are transferred to a surface of $SnO_2$ molecules. As a result, if Sn exists in the vicinity of Pt, O atoms which remained in the reduction of NOx are transferred to Sn and are transferred to the zeolite as a HC adsorbent.

However, the transferred O atoms react with a small amount of HC adsorbed on the zeolite, so that the reaction, HC (hydrocarbon)+$O_2 \rightarrow H_2O+CO_2$, occurs, and the amount of the reducing agent necessary for reducing NOx is decreased.

SUMMARY OF THE INVENTION

Therefore, an object of the present invention is to provide a catalyst having high purification performance for the exhaust gas even under a high oxygen concentration atmosphere by suppressing the decrease in the unburned HC in zeolite, to solve the above-mentioned problem.

The present invention provides a purification catalyst for exhaust gas which is used under the high oxygen concentration atmosphere, and in which cerium oxide, zeolite carrying Pt, and tin or tin oxide are mixed so as to exist in the catalyst components.

According to the purification catalyst for exhaust gas of the present invention, even in an environment with a small amount of unburned HC necessary for purifying NOx, like in diesel exhaust gas, it is possible to improve the purification performance for the exhaust gas under a high oxygen concentration atmosphere by retaining the unburned HC in the zeolite at high concentration.

Although the purification catalyst for exhaust gas under a high oxygen concentration atmosphere requires the unburned HC to purify NOx, the unburned HC contained in particularly low amounts diesel exhaust gas. Therefore, zeolite as an HC concentration supply compound, cerium oxide as an NOx concentration supply compound, and Pt as an active species to make the components react, are required in order to improve reactivity of the catalyst.

However, O atoms remain on Pt in the case in which NOx is reduced on Pt by the unburned HC. The remaining O atoms do not substantially move from the surface of Pt, so the adsorption of NOx is rate-determined in the reductive reaction on Pt, and it reduces the reactivity of Pt. Then, it is possible for the O atoms remaining on the Pt to be removed according to a spillover effect by adding tin or tin oxide.

In the addition of tin or tin oxide as a binder, tin or tin oxide is disposed in the interparticle space between cerium oxide, Pt, and zeolite, to provide contacts for tin or tin oxide with cerium oxide, Pt, and zeolite. Therefore, the O atom spilled over from Pt is made to have a composition in which the O atom can move to both cerium oxide and zeolite. The O atoms moved to cerium oxide contribute to an improvement effect in the concentration effect by highly oxidizing NOx, and the O atoms moved to zeolite contributes to an improvement effect in the ability to partially oxidize the unburned HC.

In a technique for adding tin or tin oxide, a technique for carrying by impregnation is also considered. However, according to this technique, when, for example, tin or tin oxide is carried by cerium oxide, contacts of tin or tin oxide with Pt and zeolite are scaled-down, and there is a possibility that tin or tin oxide will be buried in cerium oxide by grain growth in cerium oxide by exposing cerium oxide to high-temperature exhaust gas in the use with this technique. When tin or tin oxide is carried by zeolite, contacts of tin or tin oxide with Pt expand, and the spillover effect appears. However, a distance between tin or tin oxide and cerium oxide as a NOx concentration compound is extended. Therefore, the O atoms can be previously moved to zeolite to be used in the oxidation of HC, so HC as a reducing agent is not supplied, and therefore the improvement effect for NOx purification performance is not observed.

Therefore, it is preferable that tin or tin oxide be added as a binder in the purification catalyst for exhaust gas of the present invention. For the binder of the present invention, it is also possible to use a sol in which tin or tin oxide is mixed with water as it is and a silica binder to which tin or tin oxide is added. Furthermore, it is preferable that the purification catalyst for exhaust gas of the present invention be carried by a honeycomb support by forming the slurry into shape that from the viewpoint of increasing the surface area for exhaust gas. In this case, since the binder also has a role in which the catalyst components are retained by the honeycomb support, it is preferable that tin or tin oxide be added at 5 weight % or more in the catalyst in the present invention. The amount used of tin or tin oxide in this case is the binder quantity which is included in the catalyst component after firing. If the amount of the tin or tin oxide is less than 5 weight %, the catalyst component will peel off after the catalyst component is carried on the honeycomb support.

DETAILED DESCRIPTION OF THE INVENTION

Figure 1:
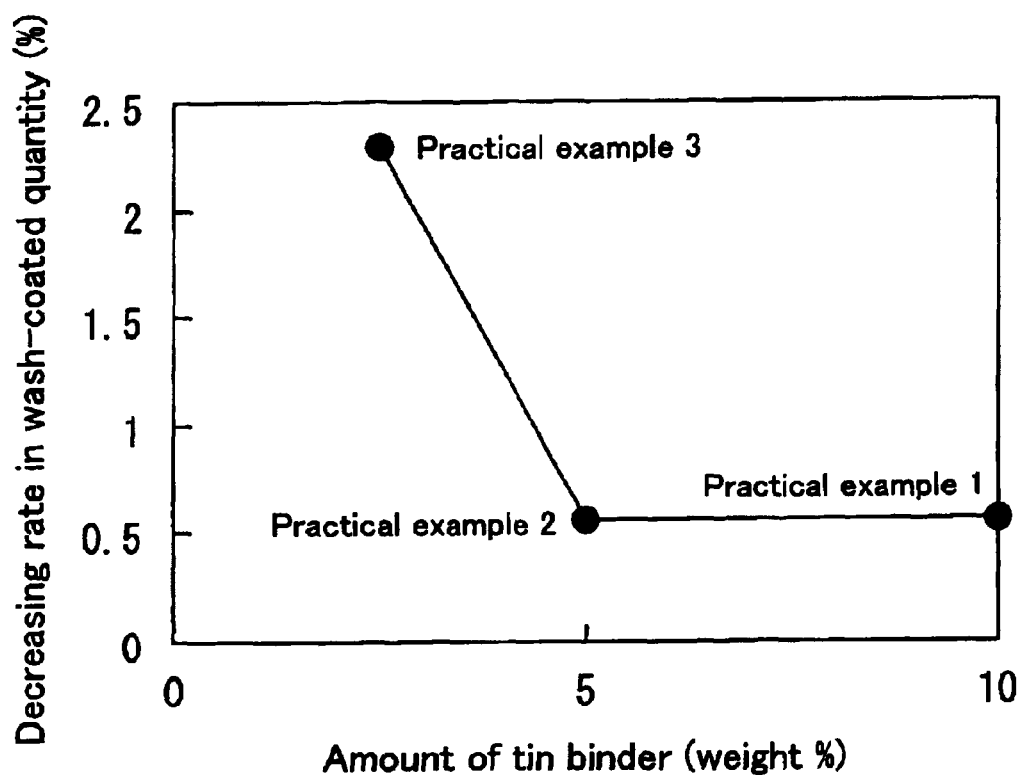
FIG. 1 is a diagram of showing the effect on peeling strength according to the amount of tin binder in a purification catalyst for exhaust gas of the present invention.

Embodiments of the present invention will be explained hereinafter with reference to the figure to clarify the effects of the present invention.

1. Manufacture of a Catalyst

Practical Example 1

H-type ZSM 5 (a molar ratio between $SiO_2$ and $Al_2O_3$ is 40:1) of 92 g was added to 1.5 weight % dinitro diammineplatinum ammonia solution of 889 g (Pt concentration: 0.9 weight %), and water was removed by a rotary evaporator. The obtained powder was dried at 150° C. for 3 hours, and next was fired at 400° C. for 12 hours in a muffle furnace, to obtain ZSM5 (Pt concentration: 8 weight %) which carried Pt.

The Pt-carried ZSM5 of 15 g, cerium oxide of 30 g, tin binder (a sol comprising $SnO_2$ of 5 g and water of 45 g, $SnO_2$ concentration: 10 weight %) of 50 g, water of 100 g, and alumina spheres were placed in a vessel, and they were minutely crushed in a wet condition for 12 hours to obtain a slurryed catalyst.

A honeycomb support made of cordierite, which was 30 cc in honeycomb volume, 400 cells/in$^2$ and 6 mil thick, was soaked in the slurryed catalyst, the honeycomb support was taken out from the slurryed catalyst, superfluous parts in the support were removed by an air jet, and the honeycomb support was heated to 150° C. for 1 hour. This operation was repeated until a fixed carrier quantity was obtained.

After obtaining the fixed carrier quantity, the honeycomb support was fired at 400° C. for 12 hours in the muffle furnace, to obtain a catalyst of practical example 1, which had a composition of Pt-carried ZSM5 and $CeO_2$. Wash-coated quantity was 200 g/L, Pt quantity was 4.8 g/L and the amount of tin binder for the wash-coated quantity was 10 weight %. Furthermore, the wash-coated quantity was the quantity of the catalytic layer carried by the honeycomb support.

Practical Example 2

A catalyst of practical example 2 which had a composition of Pt-carried ZSM5 and $CeO_2$ was obtained, in the same way as the practical example 1, but the quantity of tin binder ($SnO_2$ concentration: 10 weight %) for the manufacture of the slurryed catalyst in the practical example 1 was made to be 25 g. Wash-coated quantity was 200 g/L, Pt quantity was 5.1 g/L and an amount of tin binder for the wash-coated quantity was 5 weight %.

Practical Example 3

A catalyst of practical example 3 which had a composition of Pt-carried ZSM5 and $CeO_2$ was obtained, in the same way as the practical example 1, but the quantity of tin binder ($SnO_2$ concentration: 10 weight %) for the manufacture of the slurryed catalyst in the practical example 1 was made to be 12.5 g. Wash-coated quantity was 200 g/L, Pt quantity was 5.2 g/L and the amount of tin binder for the wash-coated quantity was 2.5 weight %.

Comparative Example 1

After Pt-carried ZSM5 was manufactured in the same way as the practical example 1, the Pt-carried ZSM5 of 15 g, cerium oxide of 30 g, silica binder ($SnO_2$ concentration: 20 weight %) of 25 g, water of 100 g and alumina spheres were placed in a vessel, and they were minutely crushed in a wet condition for 12 hours, to obtain a slurryed catalyst.

A catalyst of comparative example 1 which had a composition of Pt-carried ZSM5 and $CeO_2$ was obtained by using the slurryed catalyst and performing the latter operation in the same way as the practical example 1. Wash-coated quantity was 200 g/L, and Pt quantity was 4.8 g/L.

Comparative Example 2

H-type ZSM 5 (a molar ratio between $SiO_2$ and $Al_2O_3$ is 40:1) of 84 g was added to stannic chloride solution adjusted in order to contain 16 g of $SnO_2$, water was removed by a rotary evaporator. The obtained powder was dried at 150° C. for 3 hours, and next was fired at 600° C. for 2 hours in a muffle furnace, to obtain a powder A of ZSM5 ($SnO_2$ concentration: 16 weight %) which carried $SnO_2$.

The powder A of 82 g was added to 1.5 weight % dinitro diammineplatinum ammonia solution of 889 g (Pt concentration: 0.9 weight %), and water was removed by a rotary evaporator. The obtained powder was dried at 150° C. for 3 hours, and next was fired at 400° C. for 12 hours in a muffle furnace, to obtain ZSM5 (Pt concentration: 8 weight %) which carried Pt and $SnO_2$.

The Pt and $SnO_2$-carried ZSM5 of 15 g, cerium oxide of 30 g, tin binder (a sol comprising of $SnO_2$ of 5 g and water of 45 g, $SnO_2$ concentration: 10 weight %) of 50 g, water of 100 g and alumina spheres were placed in a vessel, and they were minutely crushed in a wet condition for 12 hours, to obtained a slurryed catalyst.

A catalyst of comparative example 2 which had a composition of Pt and $SnO_2$-carried ZSM5 and $CeO_2$ was obtained by using the slurryed catalyst and performing the latter operation in the same way as the practical example 1. Wash-coated quantity was 200 g/L, Pt quantity was 4.8 g/L.

2. Ageing of the Catalysts

For the catalysts of the practical examples 1 to 3 and the comparative examples 1 and 2 such as those described above, the catalysts were aged at 550° C. for 60 hours in a tube shaped furnace in an atmosphere of 10% oxygen, 10% water, and the balance of nitrogen.

3. Evaluation of the Catalysts

For the catalysts of the practical example 1 and the comparative examples 1 and 2 which were aged, a model gas comprising of $CO_2$: 3.6%, $O_2$: 15%, CO: 1100 ppm, $C_3H_6$: 420 ppm, NO: 160 ppm, $H_2O$: 4% and $N_2$: balance, was set in order to evaluate purification performance in exhaust gas of a diesel engine. Then, the model gas was heated at a rate of 20° C./min to increase the temperature from 50° C. to 350° C. at SV=50000/h, and NOx purification rate at each temperature was measured. The results are given in Table 1.

TABLE 1

| | NOx purification rate at each temperature (%) | | | | | | |
|---|---|---|---|---|---|---|---|
| | 50° C. | 100° C. | 150° C. | 200° C. | 250° C. | 300° C. | 350° C. |
| Practical example 1 | 2.72 | 3.81 | 52.77 | 72.16 | 6.82 | 0.78 | 0.36 |
| Comparative example 1 | 0.00 | 7.21 | 7.21 | 18.00 | 28.71 | 1.27 | −0.48 |
| Comparative example 2 | 4.04 | 2.98 | 4.34 | 12.41 | 25.77 | 1.80 | −0.29 |

As shown in Table 1, in the catalyst of the practical example 1 of the present invention, in which cerium oxide, zeolite carrying Pt and tin or tin oxide were mixed so as to exist in the catalyst components, a value of the NOx purification rate was very high at the 150 to 200° C., so it was shown to be extremely excellent in the purification catalyst of the present invention. In contrast, in the catalyst of the comparative example 1 in which silica was used instead of tin or tin oxide, and in the catalyst of the comparative example 2 in which Pt and $SnO_2$-carried ZSM5 was used instead of Pt-carried ZSM5, values of the NOx purification rate increased a little, but it was difficult to say that purifying NOx was carried out efficiently. That is, it was shown that the superior NOx purification performance did not occur, when tin or tin oxide did not exist and when not only Pt but also tin oxide was carried by zeolite.

4. Peeling Strength Measurement

The peeling strength was measured for the catalysts of the practical examples 1 to 3 which were aged, and an effect on the peeling strength by the amount of tin binder for the wash-coated quantity was examined. The measurement of the peeling strength was carried by means of soaking each catalyst, cored at a diameter of 25.4 mm and a length of 60 mm, for 15 minutes in an ultrasonic washer, to measure the weight before and after the soaking, and to measure the decreasing rate of the weights. This results are given in FIG. 1.

As shown in FIG. 1, it was demonstrated that the decreasing rate in wash-coated quantity increased in the case in which the amount of tin binder for the wash-coated quantity was less than 5 weight % (the practical example 3). Therefore, it was confirmed that the form in which the amount of tin binder for the wash-coated quantity was not less than 5 weight % is a desirable form in this invention.

What is claimed is:

1. A purification catalyst for exhaust gas under a high oxygen concentration atmosphere, comprising cerium oxide, zeolite carrying Pt, and at least one of tin and a tin oxide, wherein the at least one of tin and tin oxide is disposed in the interparticle space between the cerium oxide, Pt and zeolite.

2. A purification catalyst for exhaust gas according to claim 1, wherein the at least one of tin and tin oxide is added in the catalyst at not less than 5 weight %.

3. A purification catalyst for exhaust gas under a high oxygen concentration atmosphere, comprising cerium oxide, zeolite carrying Pt, and at least one of tin and tin oxide, wherein the at least one of tin and tin oxide is added as a binder.

4. A purification catalyst for exhaust gas according to claim 3, wherein the at least one of tin and tin oxide is added in the catalyst at not less than 5 weight %.

* * * * *